United States Patent Office 3,682,772
Patented Aug. 8, 1972

3,682,772
STEAM GENERATOR FOR POWER PLANTS HEATED BY NUCLEAR ENERGY
Walter Bredtschneider, Erlangen, Germany, assignor to Siemens Aktiengesellschaft, Berlin and Munich, Germany
Filed Apr. 15, 1969, Ser. No. 816,290
Claims priority, application Austria, Apr. 17, 1968, A 3,730
Int. Cl. G21c *19/28*
U.S. Cl. 176—54        17 Claims

ABSTRACT OF THE DISCLOSURE

Steam generator for power plants heated by nuclear energy includes a reactor core, a pressure housing surrounding the reactor core and having inner space for receiving a supply of feedwater therein, means for passing steam through the reactor core for superheating the steam, and means for heating feedwater located in the inner space with part of the superheated steam so as to turn the feedwater into steam.

---

Figure 1:
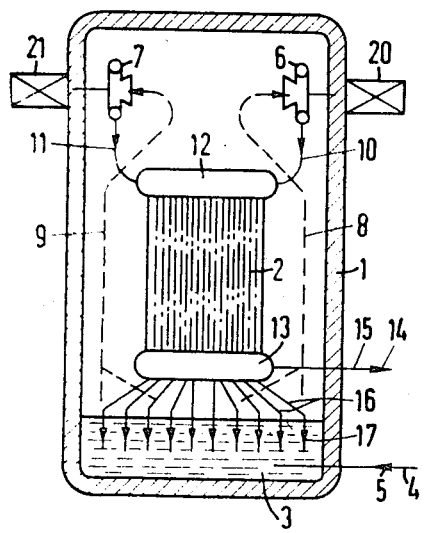

My invention relates to steam generator for power plants operated by nuclear energy and, more particularly, to such steam generators operating for example on the principle of the Loffler boiler, wherein in accordance with the steam circulating system, the superheat warmth of part of the generated steam is used for vaporizing feedwater supplied to the generator.

A steam generator of the Loffler boiler type generally includes a boiler drum having a water and a steam chamber, superheated steam being continuously introduced into the water chamber of the boiler drum so that, in this manner, feedwater supplied to the boiler is vaporized. The wet steam supplied to the heating surfaces of the boiler are superheated there, a partial flow of the superheated steam being branched off and used for newly forming additional steam.

A boiler of this type differs from boilers of otherwise conventional construction essentially in that it has only superheater heat surfaces and not water guiding heat surfaces. Such a boiler is therefore suited especially for heating by nuclear energy because the steam produced thereby can be conducted directly to the power units or engines.

It is an object of my invention to provide an improved steam generator having a boiler operating on the same principle as that of the hereinabove described Loffler boiler.

With the foregoing and other objects in view, I provide in accordance with my invention, steam generator for power plants heated by nuclear energy wherein the superheat warmth of part of the steam generated therein is employed for vaporizing feedwater supplied therein, comprising a reactor core, a pressure housing surrounding the reactor core and having inner space wherein the feedwater to be vaporized is received, means for passing steam through the reactor core for superheating the steam, and means for heating the feedwater located in the inner space with part of the superheated steam so as to turn the feedwater into steam. Thus, the reactor core is actually located within the steam chamber of the generator, and no additional pressure vessel is required nor are any lines or ducts necessary for connecting the boiler drum to the pressure housing of the nuclear reactor. Generally, the dimensions of the reactor pressure housing are such that sufficient space is provided in the lower part of this housing to receive a quantity of feedwater therein from which the generation of steam takes place.

In accordance with further features of my invention the reactor core located in the pressure housing is traversible by steam circulating therethrough in a downward direction. The circulating steam is driven by a steam circulating pump or several such steam pumps or blowers into a saturated steam collecting chest or manifold located above the reactor core, and is heated in the reactor core to superheated steam which then flows downwardly out of the reactor core into a corresponding superheated steam collecting chest, or manifold from which part of the superheated steam is conducted to a steam consuming device, such as a turbine for example, wherein it is expanded. The remainder of the superheated steam is passed through a plurality of nozzles into the feedwater contained in the interior space of the pressure housing wherein it gives up its superheat warmth and thereby produces new saturated steam from the thus heated feedwater.

In accordance with additional features of my invention, I provide one or more water tubs or troughs located above one another in the interior space of the pressure housing so as to form additional water chambers in order to increase the surface area of the water contained in the lower part of the housing, the superheated steam that is fed into the water being distributed among the various water chambers. For this purpose, a superheated steam distributor device is located above the surfaces of the water and is constructed as drop catcher and drop vaporizer for drops of water entrained from the surfaces of the water by the superheated steam flow.

It is also a feature of my invention to provide means for introducing all of the feedwater into the uppermost water tub or trough so that the feedwater, unless it is completely vaporized in the uppermost water tub or trough, overflows cascade-like therefrom into the next succeeding lower tub or trough, in which case, regulation of the water level need only be provided in the lowermost water chamber or space so that the control of the feedwater supply is especially simplified thereby.

In accordance with other features of my invention, the steam chamber portion of the reactor housing located above the reactor core is separated from the remaining portion of the steam chamber, so that it serves directly as collecting space or manifold for the saturated steam passing through the reactor core 2. The steam circulating pumps 6 and 7 drive the inducted saturated steam into the collecting space located above the reactor core, the drive shafts of these pumps 6 and 7 extending, if necessary, outwardly through the pressure housing wall so that the pump drive mechanisms, such as suitable motors, for example, are located outside the pressure housing. The steam circulation can be effective by itself alone or additionally through steam jet pumps wherein steam of higher pressure than that of the circulating steam is employed as driving means or propellant. The steam of higher pressure is produced separately in surface-heat exchangers wherein the superheated steam conducted to the water chambers relinquishes part of the superheat warmth thereof as heating means therefor. Such surface-heat exchangers are disposed within the steam chamber of the reactor pressure housing at suitable locations therein.

In accordance with even further features of my invention a surface-heat exchanger and one or more steam jet pumps are located outside the reactor pressure housing, the injector driven by the steam of higher pressure inducting the superheated steam emerging from the surface-heat exchanger and driving it into the water chambers of the boiler. In such case, the surface-heat exchanger is advantageously heated by an external source, so as to warm up the entire system and to set in operation the circulatory flow or at least be applied therewith. The partly cooled steam leaving the surface-heat exchanger is also capable of being inducted by a steam circulating pump which pumps it back into the water chambers of the boiler. This circulating pump is driven by a reaction turbine which receives the steam generated in the surface-heat-exchanger as driving steam, the exhaust steam of the reaction turbine being admixed with the circulating steam driven by the steam circulating pump.

In many cases, consideration must be given to the fact that greater heat development occurs in the center of the reactor core than in the marginal zones thereof. It has already been thought of to provide an increased cooling action in the center of the core. Within the scope of and in accordance with the invention of the instant application, I effect the increased cooling in the interior of the reactor core by concentrically subdividing the superheated steam collecting chest or manifold located below the reactor core so that the spent steam can be withdrawn from one of the thus concentrically subdivided chamber portions and the superheated steam from the other of the chamber portions can be introduced into the water chamber. Both superheated steam collecting chamber portions can be connected to one another through the intermediary of a shut-off member.

Other features which are considered as characteristic for the invention are set forth in the appended claims.

Although the invention is illustrated and described herein as embodied in steam generator for power plants heated by nuclear energy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1 to 7 are diagrammatic views of different embodiments of the steam generator according to my invention.

Referring now to the drawings and first particularly to FIG. 1 thereof there is shown an embodiment of the steam generator of my invention wherein a pressure housing 1 serves simultaneously as the vessel wherein the steam is to be generated and corresponds to the drum of a so-called Löffler boiler. In the steam chamber of this vessel 1 there is located a nuclear reactor core 2, while a volume of water 3 to a given level is contained in the lower part of the chamber enclosed by the pressure housing 1. Feedwater is supplied from the outside in the direction of the arrow 5 into the vessel 1 through an inlet duct 4. By introducing superheated steam into the water chamber 3, saturated steam is continuously produced and is inducted by the steam pumps 6 and 7, powered by driving mechanisms such as motors 20 and 21, respectively, along the paths 8 and 9 and drawn through the ducts 10 and 11 into a saturated steam collection chest or manifold 12 located above the reactor core 2. The superheated steam discharging downwardly from the reactor core 2, as viewed in FIG. 1, flows into a superheated steam chest or manifold 13, from which part of the superheated steam flows outwardly through a line 15 in direction of the arrow 14 to a non-illustrated steam turbine or other steam consuming apparatus, while the remainder of the superheated steam is conducted through a multiplicity of lines 16 to respective nozzles 17 disposed within the water chamber 3, for producing fresh saturated steam therein.

Figure 2:
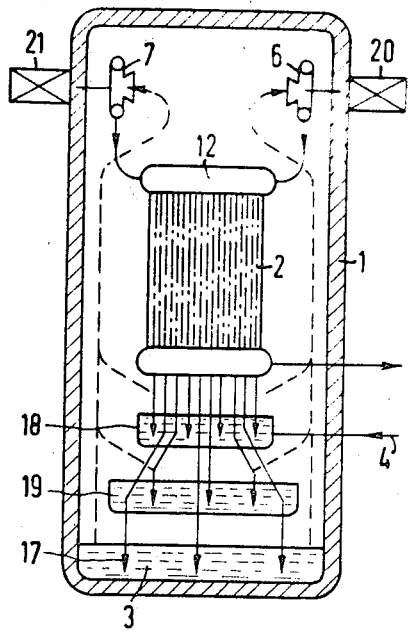

In the embodiment of FIG. 2, the surface of the water contained in the lower part 3 of the chamber in the vessel 1 is increased by providing additional chambers in the form of tubs or troughs 18 and 19 above the water chamber 3, the feedwater inlet line 4 being connected to the upper tub 18 for supplying feedwater thereto which overflows cascade-like into the tub 19 and then into the lower water chamber 3. The water level control for regulating the supplied quantity of feedwater is thus limited to maintaining the level of water in the chamber 3.

Figure 3:
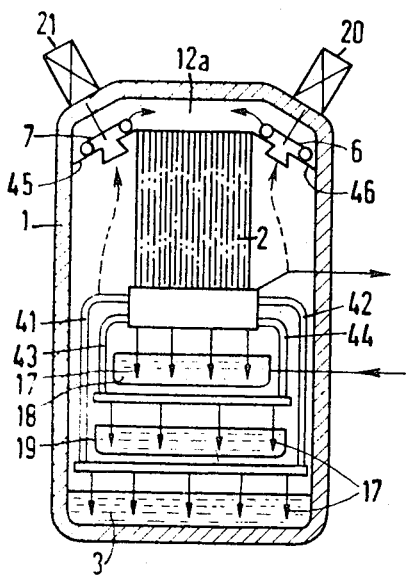

In FIG. 3, the illustrated embodiment has steam supply lines 41 to 44 for the tubs 18 and 19 located above one another which serve as drop catcher and drop vaporizer. The collection chest or manifold 12 located above the reactor core 2 in FIGS. 1 and 2 is replaced in FIG. 3 by the space 12a formed of part of the steam chamber of the reactor housing 1 and divided from the rest of the steam chamber by walls 45 and 46. The drive mechanisms such as the motors 20 and 21 for the steam blowers 6 and 7, as shown in FIGS. 1 to 3, are located outside the pressure housing 1.

Figure 4:
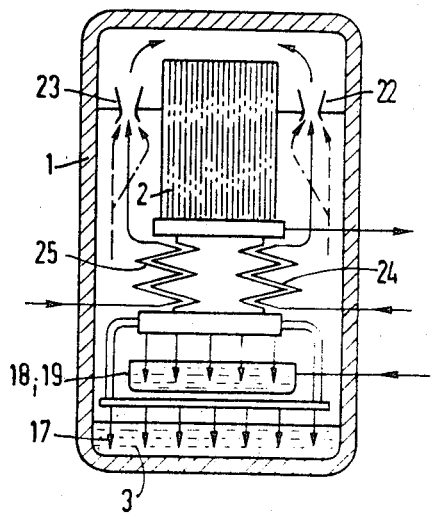

In the embodiment of FIG. 4, the steam circulation is effected by steam injectors 22 and 23, steam at very high pressure produced in the surface-heat exchangers 24 and 25 acting as the driving steam passing through the injectors 22 and 23. The superheated steam which is conducted to the water chambers 17, 18 and 19 surrenders part of its superheat warmth as the heating medium in the heat exchangers 24 and 25.

Figure 5:
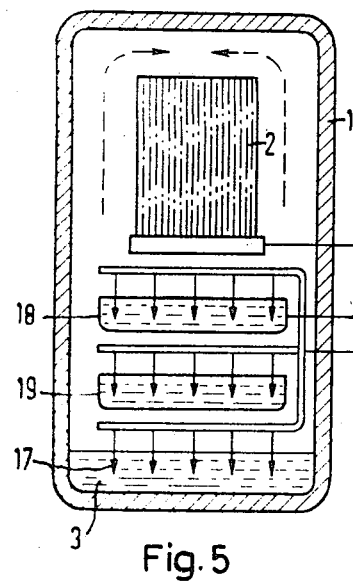

The embodiment of FIG. 5 has a surface-heat exchanger 26 and a steam jet pump 27 serially connected outside the reactor housing 1, the superheated steam passing from the surface-heat exchanger 26 through the line 28 being inducted by the injector or jet pump 27 driven by the steam at very high pressure and being thereby advanced into the water chambers 17, 18 and 19 of the boiler 1. The surface-heat exchanger 26, as indicated by the arrows 29, can be subjected to auxiliary external heating so as to warm up the entire system. Moreover, the boiler 1 can be started up thereby.

Figure 6:
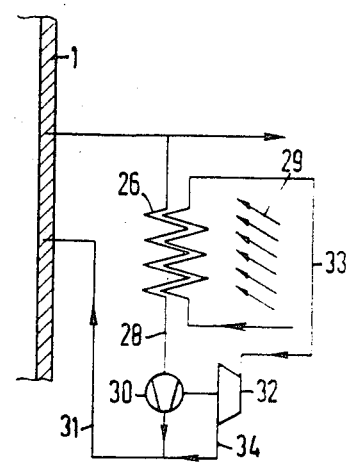

In the embodiment of FIG. 6, the boiler including the reactor core 2 and the water chambers 17, 18 and 19 of, for example, FIG. 5, have been omitted to conserve space. As shown in FIG. 6, the partially cooled steam conducted out of the surface-heat exchanger 26 through the line 28 is inducted by a steam circulator pump 30, which pumps it back into the water chambers in the boiler 1, the circulating pump 30 being driven by a reaction turbine 32 which receives as driving steam through the line 33 the high-pressure steam produced in the surface-heat exchanger 26. The exhaust steam of the turbine 32 is admixed through the line 34 with the circulating steam driven by the steam circulating pump 30.

Figure 7:
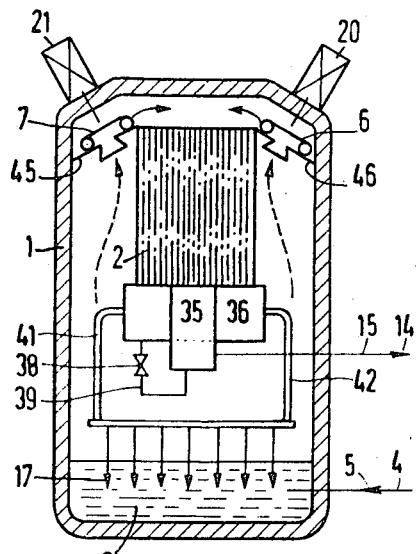

FIG. 7 illustrates yet another embodiment wherein there is provided a greatly different heat distribution in the inner region of the reactor core 2 in contrast to the peripheral region thereof as in the aforedescribed embodiments. The superheated steam receiving or collecting chamber is concentrically or coaxially divided below the reactor core 2 in FIG. 7 so that an outer chamber 36 is concentrically disposed about a middle chamber 35. If the entire reactor core is to be cooled at start-up of the boiler 1, when no useful steam is yet produced, both chambers 35 and 36 are connected to one another through a line 39 provided with a shut-off member or valve 38.

I claim:

1. Steam generator for power plants heated by nuclear energy, comprising a reactor core, a pressure housing surrounding said reactor core and having inner space for receiving a supply of feedwater therein, means for passing steam through said reactor core for superheating the steam, means for heating feedwater located in said inner space with part of the superheated steam so as to turn the feedwater into steam, a saturated steam collecting chamber located above said reactor core, and at least one steam circulating pump located in said pressure housing for driving into said saturated steam collecting chamber the steam into which the feedwater has been turned.

2. Steam generator for power plants heated by nuclear energy, comprising a reactor core, a pressure housing surrounding said reactor core and having inner space for receiving a supply of feedwater thereto, means for passing steam through said reactor core for superheating the steam, means for heating feedwater located in said space with part of the superheated steam so as to turn the feedwater into steam, said means for passing steam through said reactor core being part of a steam circulatory system and passing the steam in a downward direction through said reactor core, a saturated steam collecting chamber located below said reactor core for collecting the superheated steam formed in said reactor core, and means for conducting part of the superheated steam out of said pressure housing to a steam consuming device and the remainder of the superheated steam through a plurality of nozzles into the inner space in said pressure housing wherein the supply of feedwater is received.

3. Steam generator for power plants heated by nuclear energy, comprising a reactor core, a pressure housing surrounding said reactor core, and having inner space for receiving a supply of feedwater therein, means for passing steam through said reactor core for superheating the steam, means for heating feedwater located in said inner space with part of the superheated steam so as to turn the feedwater into steam, said inner space of said pressure housing for receiving said supply of feedwater therein being subdivided into a plurality of water chambers located one above the other and having respective open tops for exposing the surfaces of water contained in the respective water chambers, whereby the overall water surface area is multiplied.

4. Steam generator according to claim 3 wherein said feedwater heating means includes means for individually distributing said part of the superheated steam to said plurality of water chambers.

5. Steam generator according to claim 4 wherein said superheated steam distributing means is located above said water chambers and is formed as a drop catcher and drop vaporizer for water drops entrained from the water surfaces in said water chambers.

6. Steam generator according to claim 3 including means for feeding all of the feedwater to the uppermost water chamber so that non-vaporized feedwater in said uppermost water chamber overflows cascade-like into the next lower water chamber.

7. Steam generator for power plants heated by nuclear energy, comprising a reactor core, a pressure housing surrounding said reactor core and having inner space for receiving a supply of feedwater therein, means for passing steam through said reactor core for superheating the steam, means for heating feedwater located in said inner space with part of the superheated steam so as to turn the feedwater into steam, said reactor core, said means for passing steam therethrough and said means for heating the feedwater being all located within an interior chamber defined by said pressure housing, and including a saturated steam collecting chamber located above said reactor core and separated from the remainder of said interior chamber, and means for passing saturated steam formed from the feedwater directly into said saturated steam collecting chamber preparatory to passing it through said reactor core for superheating the steam.

8. Steam generator according to claim 1 including a drive mechanism for said steam circulating pump located outside said pressure housing.

9. Steam generator for power plants heated by nuclear energy, comprising a reactor core, a pressure housing surrounding said reactor core and having inner space for receiving a supply of feedwater therein, means for passing steam through said reactor core for superheating the steam, means for heating feedwater located in said inner space with part of the superheated steam so as to turn the feedwater into steam, a saturated steam collecting chamber located above said reactor core, and steam jet pumping means for circulating saturated steam formed from the feedwater through said saturated steam collecting chamber, said steam jet pumping means being driven by steam having a higher pressure than that of the circulating steam.

10. Steam generator according to claim 9 including at least one surface-heat exchanger for generating said steam having a higher pressure than that of the circulating steam, and means for passing through said surface-heat exchanger at least some of said part of the superheated steam employed for heating the feedwater so that some of the superheat warmth of the superheated steam is available as heating means in said surface-heat exchanger.

11. Steam generator according to claim 10 wherein said surface heat exchanger is located in the interior of said pressure housing.

12. Steam generator according to claim 10 wherein said surface-heat exchanger is located outside said pressure housing, and said steam jet pumping means comprises an injector connected downstream of said surface-heat exchanger for inducting super-heated steam from said surface-heat exchanger and passing it into the feedwater located in said inner space of said pressure housing.

13. Steam generator according to claim 12 wherein said injector is located outside said pressure housing.

14. Steam generator according to claim 10 including auxiliary means for supplying heat to said surface-heat exchanger.

15. Steam generator according to claim 14 wherein said surface-heat exchanger is located outside said pressure housing and includes a primary steam side and an external secondary steam side, said steam circulating pumping means being connected downstream of said primary steam side of said surface-heat exchanger for inducting partly cooled steam from said surface-heat exchanger and circulating the same into the feedwater located in said inner space of said pressure housing, and including reaction turbine means connected to said pumping means for driving the same, said reaction turbine means being driven by steam from said secondary steam-side of said surface-heat exchanger having a higher pressure than the steam in said primary side thereof, and means for intermixing exhaust steam from said reaction turbine with the steam circulated by said steam circulating pumping means.

16. Steam generator according to claim 2 wherein said superheated steam collecting chamber located below said reactor core is divided into at least two concentric subchambers, one of which communicates with the steam consuming device and the other of which communicates with the inner space in said pressure housing wherein the supply of feedwater is received.

17. Steam generator according to claim 18 including means connecting said concentric subchambers with one another, and shut-off means disposed in said connecting means.

References Cited
UNITED STATES PATENTS

| | | | |
|---|---|---|---|
| 3,072,555 | 1/1963 | Barth et al. | 176—54 |
| 3,231,474 | 1/1966 | Jones et al. | 176—54 |
| 3,284,310 | 11/1966 | Straat | 176—59 X |
| 3,287,228 | 11/1966 | Gorker | 176—54 |
| 3,325,374 | 6/1967 | Margen | 176—65 X |
| 3,372,092 | 3/1968 | Margen | 176—54 X |
| 3,400,047 | 9/1968 | Howard | 176—56 |
| 3,401,082 | 9/1968 | Ammon et al. | 176—65 X |

CARL D. QUARFORTH, Primary Examiner

S. R. HELLMAN, Assistant Examiner

U.S. Cl. X.R.

176—56, 65